United States Patent [19]
Barna et al.

[11] Patent Number: 5,551,706
[45] Date of Patent: *Sep. 3, 1996

[54] COMPOSITE GASKET FOR SEALING FLANGES AND METHOD FOR MAKING AND USING SAME

[75] Inventors: Eileen C. Barna, West Chester, Pa.; Elizabeth M. Hamilton, Elkton, Md.; Eric W. Lalli, Elkton, Md.; Cindy B. Lubin, Chapel Hill, N.C.; Wanda F. Sparks, Elkton, Md.; Alfred F. Waterland, III, Elkton, Md.

[73] Assignee: W. L. Gore & Associates, Inc., Newark, Del.

[ * ] Notice: The term of this patent shall not extend beyond the expiration date of Pat. No. 5,494,301.

[21] Appl. No.: 283,480

[22] Filed: Jul. 29, 1994

Related U.S. Application Data

[63] Continuation-in-part of Ser. No. 183,386, Jan. 19, 1994, which is a continuation-in-part of Ser. No. 118,372, Sep. 8, 1993, which is a continuation-in-part of Ser. No. 50,903, Apr. 20, 1993.

[51] Int. Cl.$^6$ .................................................. F16J 15/10
[52] U.S. Cl. ................................. 277/229; 277/227
[58] Field of Search .................... 277/227, 229, 277/230

[56] References Cited

U.S. PATENT DOCUMENTS

| | | | |
|---|---|---|---|
| 1,909,534 | 5/1933 | Hall | 277/229 |
| 2,459,721 | 1/1949 | Poltorak | 277/229 |
| 3,393,504 | 7/1968 | Dodge, Jr. | 57/144 |
| 3,756,004 | 9/1973 | Gore | 57/11 |
| 3,878,031 | 4/1975 | Dormer | 277/230 |
| 3,894,742 | 7/1975 | Trelease | 277/229 |
| 3,953,566 | 4/1976 | Gore | 264/288 |
| 4,330,136 | 5/1982 | Henson | 277/229 |
| 4,576,861 | 3/1986 | Kato | 428/316.6 |
| 4,743,421 | 5/1988 | McDowell et al. | 264/129 |
| 4,823,229 | 4/1989 | Waterland III | 277/227 |
| 4,898,638 | 2/1990 | Lugez | 156/272.6 |
| 4,985,296 | 1/1991 | Mortimer, Jr. | 428/220 |
| 5,072,952 | 12/1991 | Irrgeher et al. | 277/229 |
| 5,112,664 | 5/1992 | Waterland, III | 428/76 |
| 5,160,773 | 11/1992 | Sassa | 428/76 |
| 5,301,960 | 4/1994 | Meyer et al. | 277/230 |

FOREIGN PATENT DOCUMENTS

| | | |
|---|---|---|
| 0159942 | 10/1985 | European Pat. Off. . |
| 0304141 | 2/1989 | European Pat. Off. . |
| 0415140 | 3/1991 | European Pat. Off. . |
| 4762658 | 6/1972 | Japan . |
| 4975565 | 7/1974 | Japan . |
| 55-072950 | 2/1980 | Japan . |
| 57-051450 | 3/1982 | Japan . |
| 59-115828 | 7/1984 | Japan . |
| 4331876 | 11/1992 | Japan . |
| 5099343 | 4/1993 | Japan . |
| 9104847 | 4/1991 | WIPO . |
| 9208916 | 5/1992 | WIPO . |
| 9304227 | 3/1993 | WIPO . |

OTHER PUBLICATIONS

Literature; Inertex Valve Stem Packing Literature, Inertech Supply, Inc. Gore–Tex® Valve Stem Packing, W. L. Gore & Associates, Inc. 1989 date unknown.
Literature: APV Model HXCB Paraglow Plate Heat Exchanger, 6 pages APV Crepaco, Inc., May, 1985.
Literature; Mueller® Accu–Therm® Plate Heat Exchangers, no date.

*Primary Examiner*—William A. Cuchlinski, Jr.
*Assistant Examiner*—John L. Beres
*Attorney, Agent, or Firm*—Gary A. Samuels

[57] ABSTRACT

Improved gasket material and method for use in sealing various flanged apparatus, such as found in distillation columns, glass lined vessels and transformer radiator flange seals. The gasket material comprises a cylindrical core of elongated polytetrafluoroethylene (PTFE) contained within a tight wrap of high strength film or films. The gasket material has the exceptional operational properties of PTFE, can be designed for specific situations, and has superior resistance to cold flow or "creep" which distorts most PTFE seals under heavy unconfined compression.

26 Claims, 9 Drawing Sheets

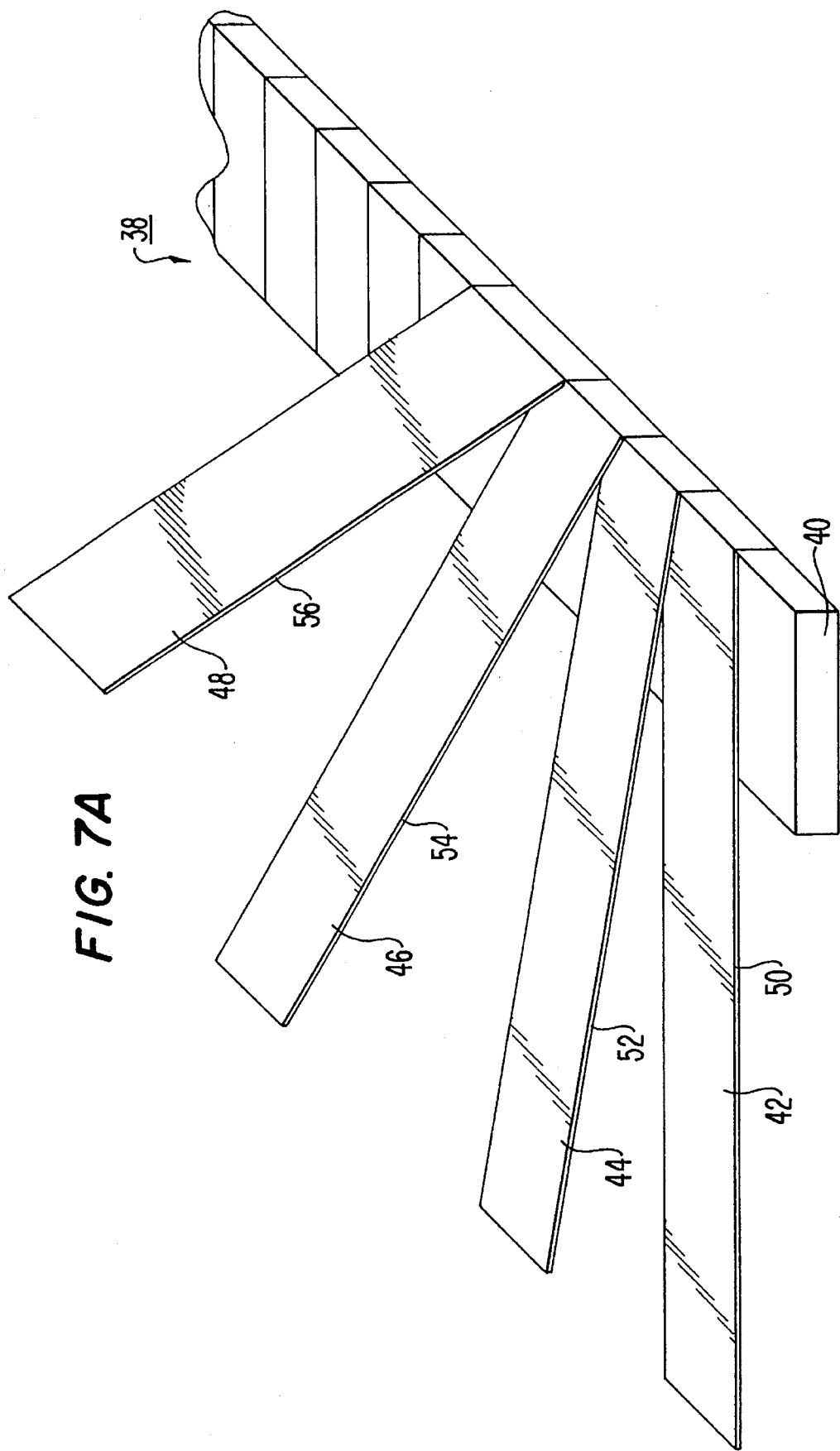

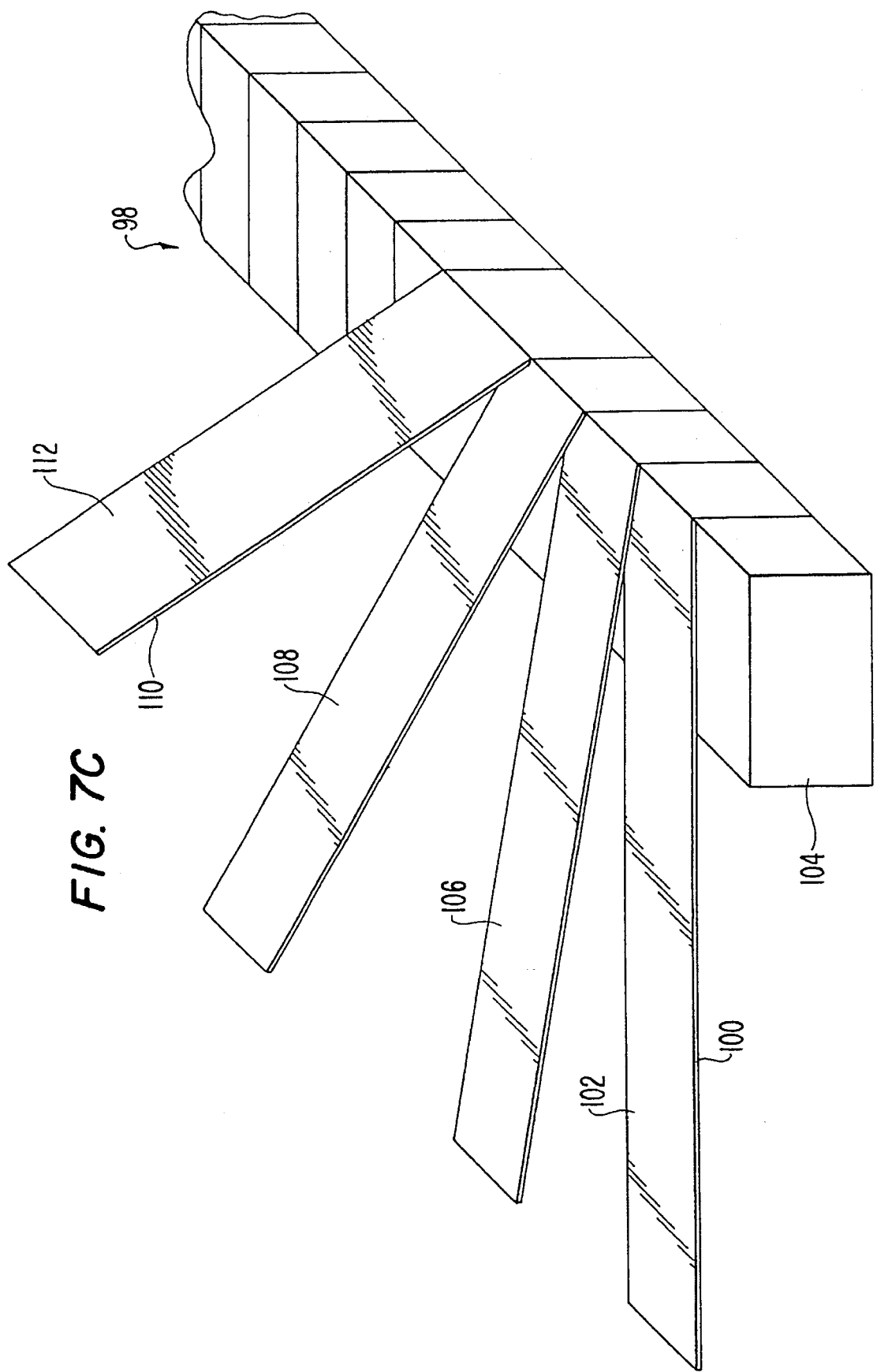

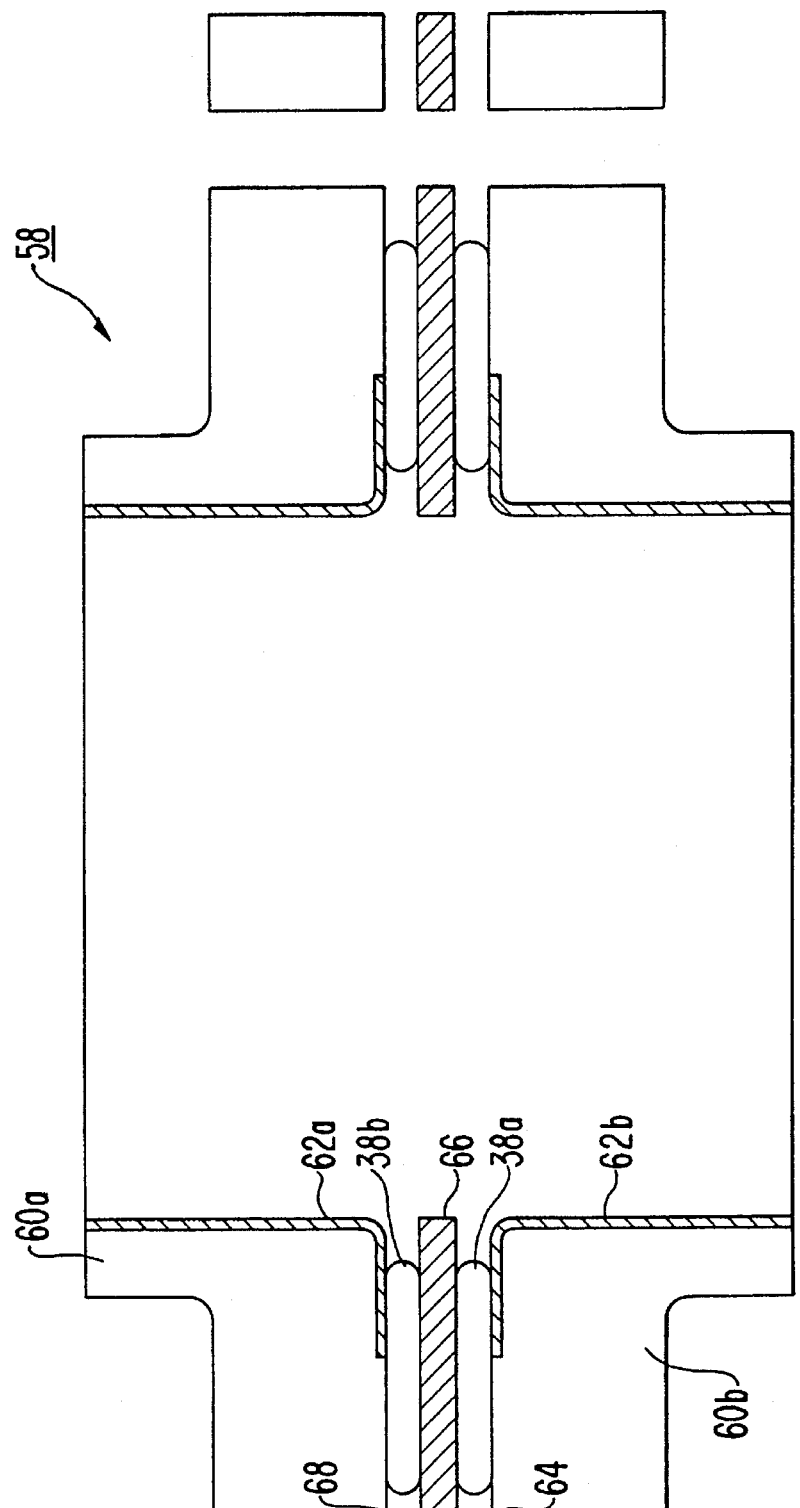

COMPOSITE GASKET FOR SEALING FLANGES AND METHOD FOR MAKING AND USING SAME

RELATED APPLICATIONS

The present application is a continuation-in-part of copending U.S. patent application Ser. No. 183,386 filed Jan. 19, 1994, which is a continuation-in-part of U.S. patent application Ser. No. 118,372 filed Sep. 8, 1993, which is a continuation-in-part of copending U.S. patent application Ser. No. 050,903, filed Apr. 20, 1993.

BACKGROUND OF THE INVENTION

1. Field of the Invention

The present invention relates to gasket and sealing materials, and especially gasket materials pre-formed into various shapes for joining sealing faces (e.g., flat faced, standing-gap, or O-ring flanges) together to restrict fluid flow through a joint, such as those employed in distillation columns, glass lined vessels, and transformer radiator flanges.

2. Description of Related Art

Gaskets are used in the joining of piping, vessels, and such enclosures where fluid seals are required between opposing sealing faces (e.g., flange faces). There are three common different mechanical situations created when sealing two flanges together, and each requires special gasket design and intrinsic material properties. The first of these is a flat faced flange where opposing flange faces do not contact one another and are separated by the gasket material. Typically gasket materials for these flanges are not constrained from expanding or "creeping" in a direction parallel to the flange faces. The second type of flange configuration is considered a standing gap flange. In a standing gap flange there is partial flange face to flange face contact but the flanges do not completely contain the gasket material on all surfaces (thus allowing creep to occur only in the unconstrained direction). Lastly, an O-ring flange has complete flange face to flange face contact. The gasket sits in a groove on at least one of the flanges and is constrained from movement on all surfaces.

Each flange configuration requires specific gasket properties designed to assure fluid tight seals. With two flanges contacting each other, such as the O-ring or the standing gap flanges, there exists flange-to-flange contact that allows the flange to carry the majority of the bolt load and external loads that may be exerted on this joint. In these cases, the gasket material must be resilient, maintaining shape in the absence of constant load on the gasket. In a flat faced flange, the gasket bears the entire bolt and external load and must be resistant to compressive creep. In all flange sealing situations, the integrity of the seal is dependent on the gasket design and properties.

An example of flat faced flange is the seal between segments in a distillation column used in the petroleum industry. Here large segments of metal or glass cylinders are stacked vertically together with a gasket required to seal between each cylinder.

Standing gap flanges are encountered when sealing glass lined structures, such as glass lined metal dome lids to glass lined metal vessels. In this case, metal-to-metal contact on the exterior metal structure is required to support the mechanical loads of the flange bolts and compressive load of the dome lid and vessel. However, the gasket must be positioned carefully between the internal glass linings of the vessel and dome cover so as not to damage the glass, yet it must provide a tight seal between the glass faces and the metal flanges. The gasket material is not constrained on its interior surface and does not bear the full compressive load of the bolts and glass lined vessel and dome. The gasket, therefore, must resist creep on its unconstrained interior surface.

An example of an application of O-rings is in radiator piping of large electric transformers. A machined metal groove in one flange face provides a cavity for the gasket material to rest with about 20–40% of its height protruding above its groove. When the second flange face is brought in contact with the first, the gasket material is compressed to form a tight seal. In this manner, the gasket material is constrained on all surfaces.

It should be understood that opposing flange faces can be made of a wide variety of materials (e.g., metal, glass/ceramic, plastic, etc.), comprising mated sealing surfaces that are either homogeneous or heterogeneous combinations of materials. Additionally, a given flange face can be constructed of heterogeneous materials, such as the case where one flange face has both metal and glass sealing surface. This situation compounds the difficulty of producing a tight and durable seal between flanged joints.

Elastomer materials such as butyl rubber, neoprene, ethylene propylene rubber (EPDM), nitrile rubber, and cork/elastomer or asbestos gaskets are commonly used in flange sealing applications, but each of these has limitations or drawbacks. For instance, a sometimes difficult compromise must be struck between a material that provides a seal and a material that is durable and chemical/heat resistant for long-term use. Another common constraint is the inability of gaskets to compensate for misaligned, bent, uneven, corroded, or otherwise defective flange faces, or as mentioned, flanges made from heterogeneous materials.

Elastomeric materials are desired from the standpoint of their resiliency and compressive counterforce. However, elastomers' long-term performance limitations when in the presence of elevated temperatures, ultra-violet radiation, or aggressive chemicals make them less than ideal for demanding applications, such as transformer radiator flanges, and glass lined vessels and distillation columns. What is required is a sealant that tightly fills the flange joint and maintains a compressive counterforce, yet is unaffected by thermal or chemical exposure.

One material that has superior heat and chemical resistant properties is polytetrafluoroethylene (PTFE). As a gasket, PTFE has exhibited utility as a material for use in harsh chemical environments that normally degrade many conventional metals, elastomers, and polymeric materials. Conventional, full density PTFE has a usable temperature range from as high as 260° C. to as low as near −273° C.

However, conventional non-porous PTFE gasket materials which have been compression molded or extruded and then heated to a temperature above 345° C. exhibit poor mechanical properties, such as low tensile strength and poor creep resistance. This limits or excludes the use of such materials in these applications requiring long term resistance to creep.

PTFE may be produced in an expanded, porous form as taught in U.S. Pat. No. 3,953,566 issued Apr. 27, 1976, to Gore. Expanded polytetrafluoroethylene (ePTFE) is of a higher strength than conventional PTFE, has the chemical inertness of conventional PTFE, and has an increased temperature range of up to about 315° C. in service. An example of a porous expanded PTFE gasket material is available from W. L. Gore & Associates, Inc., of Elkton, Md., under the trademark GORE-TEX® Joint Sealant.

Although polytetrafluoroethylene (PTFE) can provide the necessary durability, its tendency to experience compressive creep and inability to conform to shaped surfaces renders this material problematic as well. Virtually all PTFE gaskets (virgin, filled, or expanded) exhibit varying degrees of compressive creep or flow. With metal-to-metal contact of the flanges in standing gap and O-ring joint flanges, there is no mechanism for compensating for even a slight amount of creep. If the gasket creeps and, as a result, becomes thinner, there is no longer a counterforce being exerted by the gasket against the flanges.

One suggestion for achieving the chemical resistance of PTFE but limiting the amount of creep of the material is to coat a generally creep-stable material such as synthetic rubber with a coating of PTFE to provide chemical resistance. One example of such a structure is presented in U.S. Pat. No. 4,898,638 issued Feb. 6, 1990, to Lugez. In this patent it is taught that through a disclosed process one or more films of only partially porous PTFE can be adhered to a rubber sheet to provide a gasket material with chemical resistance. While this approach may addresses some of the problems with existing elastomer sealing materials, the PTFE film can crack under the stresses of compression, leading to exposure and potential failure of the core elastomer. It is believed that longer life and better thermal and chemical resistance are possible if a PTFE material is employed throughout the cross-section of the gasket.

As is disclosed in co-pending U.S. patent application Ser. No. 050,903, filed Apr. 20, 1993, it has been determined that a PTFE sealing material can be produced with limited long-term creep by wrapping a core of elongated or expanded PTFE with a high strength film of expanded PTFE. The high strength film is resistant to deformation and stretching and serves to contain the PTFE core in place within a compressed gasket. This material has proven to be quite effective in sealing plate and frame heat exchangers and the like, thereby providing thermal and chemical protection, long-life and durability, and ease in replacement. However, it is believed that with modifications such material may be useful in wide variety of other sealing environments.

Accordingly, it is a primary purpose of the present invention to provide a gasket material for sealing flanged apparatus which provides an effective long-term seal under pressure or vacuum, while being durable, conformable, chemical and thermal resistant, non-contaminating, and easy to install.

It is still another purpose of the present invention to provide a gasket material for sealing a wide range of flanges that can utilize the benefits of PTFE or expanded PTFE material, while avoiding the problem of compressive creep and gasket failure.

It is a further purpose of the present invention to provide a method for making and optimally using a gasket material with the above properties.

These and other purposes of the present invention will become evident from review of the following specification.

SUMMARY OF THE INVENTION

The present invention is an improved gasket material for use in a variety of sealing arrangements. The basic material of the present invention comprises a core of polytetrafluoroethylene (PTFE) wrapped in combination with one or more high strength films. When placed under compression in a joint, the composite gasket material of the present invention has proven to be highly resistant to cold flow or "creep," while providing all the exceptional properties of PTFE material.

The preferred gasket material of the present invention comprises an elongated or expanded PTFE core wrapped in high strength PTFE film or films and pre-compressed to a designed level to reduce the amount of compression required to install the gasket material between flanges. Alternatively, the core may be pre-compressed and then wrapped to provide the improved properties of the present invention.

The gasket material of the present invention has numerous benefits over previous flange sealing material. Among the improvements are better sealing and longer life demonstrated by improved durability in environments of harsh chemicals and/or extreme temperatures and temperature cycling.

DESCRIPTION OF THE DRAWINGS

The operation of the present invention should become apparent from the following description when considered in conjunction with the accompanying drawings, in which:

FIG. 7A is a three-quarter isometric view of one embodiment of a gasket of the present invention;

FIG. 7C is a three-quarter isometric view of still another embodiment of a gasket of the present invention;

FIG. 8A is a cross section view of a flat faced flange with heterogeneous flange surfaces and employing the gasket depicted in FIG. 7A.

DETAILED DESCRIPTION OF THE INVENTION

The present invention is a gasket material suitable for use in a variety of applications, and especially in applications requiring minimal cold flow or "creep" combined with superior chemical and temperature resistance. Of particular interest are gaskets suitable for installation in flange sealing surfaces, such as flat faced flanges, standing gap flanges, and O-ring groove flanges.

As the term "creep" is used herein, it is intended to identify a condition whereby an unrestrained material tends to flow and thin when placed under compressive pressure. Creep is a particular concern with material, such as polytetrafluoroethylene, that tends to undergo significant distortion in shape when maintained under unrestrained compressive load (e.g., with gaskets installed in a flat faced or standing gap flange). If this condition is not monitored, it can lead to loss of seal around joints and undesirable or even hazardous leaks.

Since there are a number of common flange types in a wide variety of configurations, it should be understood that considerable customizing of gasket material is required to fit the gaskets to the different flange styles, sizes, and materials of construction. Fortunately, as will be evident from the following description, the gasket material of the present invention is fully adaptable to such customizing.

Figure 1:
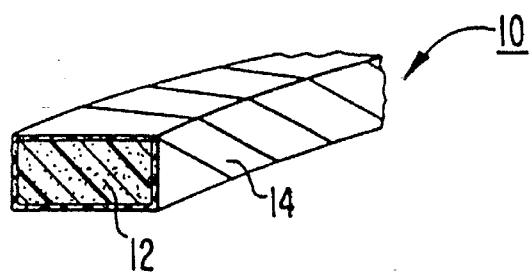
FIG. 1 is a three-quarter isometric view of cord gasket material of the present invention.

Shown in FIG. 1 is a cord 10 of material of the present invention comprising a PTFE core material 12 wrapped in a film 14. The cord 10 has been compressed into a rectangular shape suitable for many gasketing applications.

Preferably, the core material is prepared by paste extrusion of PTFE fine powder to form a rod or beading by methods and equipment known in the art. The paste extruded rod or beading is then expanded to form a flexible porous structure of nodes interconnected by fibrils by stretching it according to the process taught in U.S. Pat. No. 3,953,566 to Gore, incorporated by reference. The paste extruded PTFE rod or beading is stretched in the longitudinal direction an amount in the range 2:1 to 25:1, preferably an amount in the range 3:1 to 12:1, depending on the strength and compressibility properties desired in the core material. The core can be calendered before wrapping in order to maintain the compressibility of the outer wraps to aid in sealing.

Prior to wrapping, the elongated porous PTFE core material has a surface shape that permits the film to be wrapped in continuous contact with the surface of the core material. For use as a gasket, in many cases the elongated porous PTFE core material is wrapped in a circular cross-section and then the wrapped material is molded, calendered, or otherwise compressed to establish a preferred cross-section for installation and to optimize initial thickness, density and compressibility. Alternatively, the core may also be wrapped in virtually any shape having no recessed surfaces (e.g. rectangular, oval, square, triangular, etc.). More complex shapes, e.g., surfaces with depressions or projections, can be formed after the core material has been wrapped.

While expanded PTFE core material is preferred in the present invention, it should be appreciated that beneficial results may likewise be realized through wrapping many forms of PTFE material so as to reduce its cold flow properties. As such, improved performance through use of the present invention may also be possible by wrapping unexpanded PTFE extrudate, filled PTFE, or PTFE tapes. The term "elongated" PTFE as used herein should be read to include all such applications.

In all forms of the present invention the gasket material may be provided in a variety of forms to solve specific sealing needs. FIG. 1 illustrates a cord gasket material, with typical dimensions of 12.7 mm wide, 7.6 mm thick. The cord gasket material can be provided in continuous lengths, such as on a spool, to allow it to be cut to size for particular installation demands.

Figure 2:
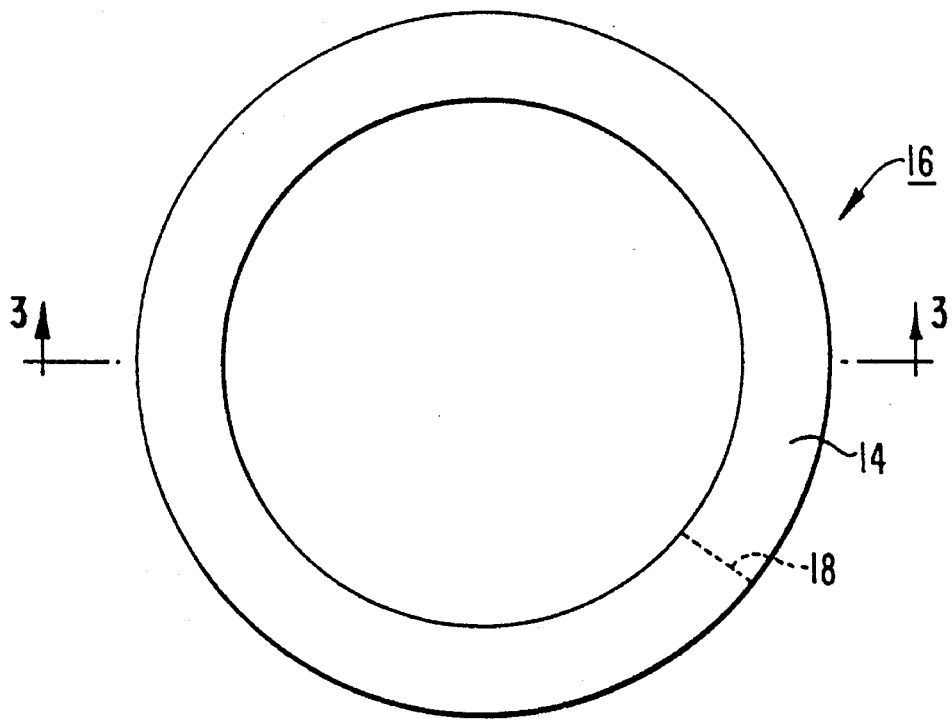
FIG. 2 is a top plan view of the cord gasket material of the present invention formed into a continuous loop.
Figure 3:
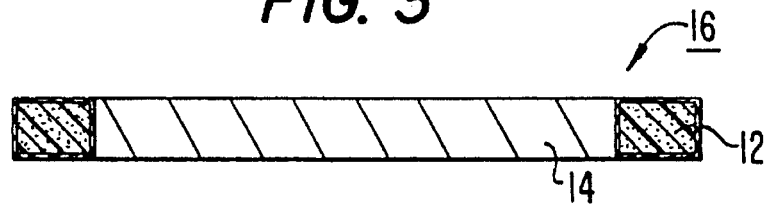
FIG. 3 is a cross-sectional view along line 3—3 of FIG. 2.

While the cord can be cut to provide specialized sealing, for most flange sealing applications the cord gasket material is joined to itself to form a continuous loop gasket 16 like that shown in FIGS. 2 and 3. A joint 18 is then connected together by simply splicing the ends. One such splicing technique comprises cutting the ends with a 1 inch minimum skive cut, holding the ends together with an adhesive or textile bar tack, wrapping the joined ends with a tape (which ideally should be similar or identical to the film wrapping the gasket material), and then heat setting the tape in place with a mold press.

The flexibility of the PTFE core and the resistance of the gasket material to creep allows the loop of gasket material to be shaped and retained in various positions for installation in a joint. One such shaped position is shown in FIGS. 4 and 5.

Figure 4:
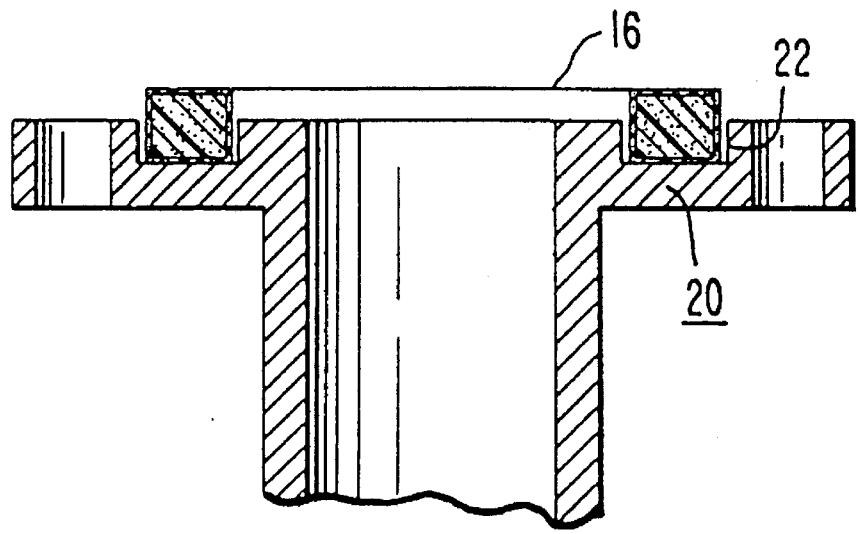
FIG. 4 is a cross-sectional view of the gasket material of the present invention positioned within an O-ring groove.
Figure 5:
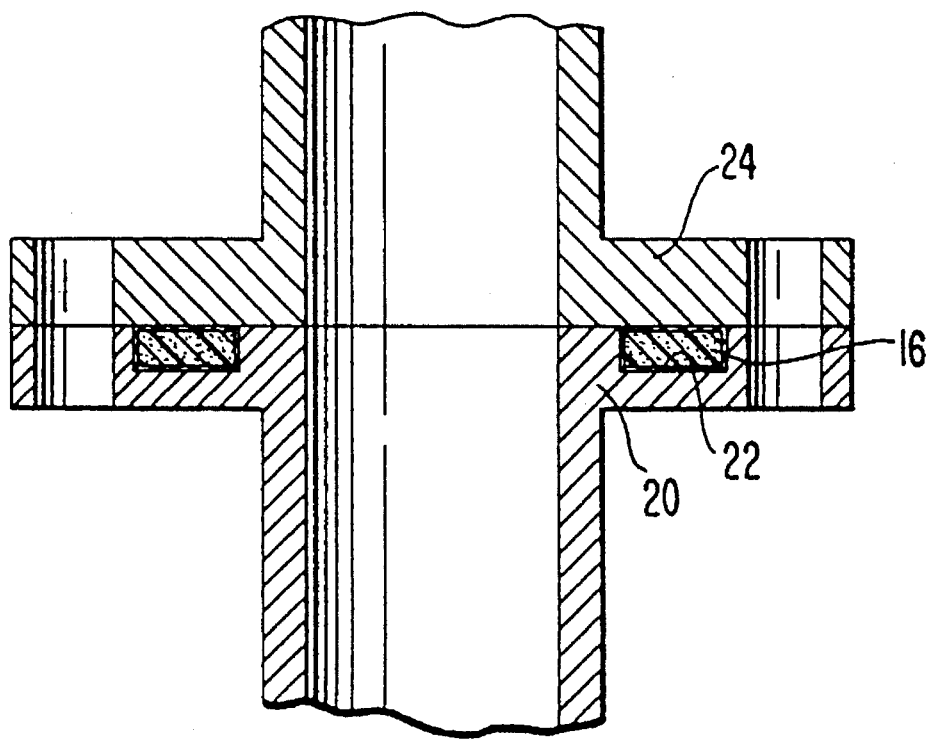
FIG. 5 is a cross-sectional view of the gasket material of the present invention positioned within an O-ring groove and compressed against an opposing flange.

FIG. 4 shows a conventional circular flange 20 having a groove 22 formed therein. Prior to sealing, the gasket 16 sits loosely within the groove 22, its thickness being approximately 2–3 times the depth of the groove. A typical O-ring groove flange application of this form may comprise a 6" nominal inside diameter (I.D.) flange with a 8⅜" outside diameter (O.D.) and a 7" I.D. groove cut into one flange. Groove depth is about ⅛". As is shown in FIG. 5, once an opposing flange member 24 is compressed against the flange 20, the gasket 16 compresses and seals against the opposing flange member 24 and spreads out to completely fill the groove 22. For the previously mentioned transformer application requiring O-ring gaskets, the preferred gasket material comprises an expanded PTFE with a density of 1.2 g/cc (within a range of 1.0 to 1.4 g/cc) after being film wrapped and shaped, which has general pre-installed dimensions of about 8.1 mm by 11.7 mm in cross section. The ring is formed to an inside diameter of about 181 mm by an outside diameter of about 207 mm. The O-ring initial thickness, density, and inside and outside diameters are selected such that when installed and the flanges are brought together, the sealant compresses to fill the groove and reaches a density in the preferred range of 1.6 to 2.1 g/cc.

Figure 6A:
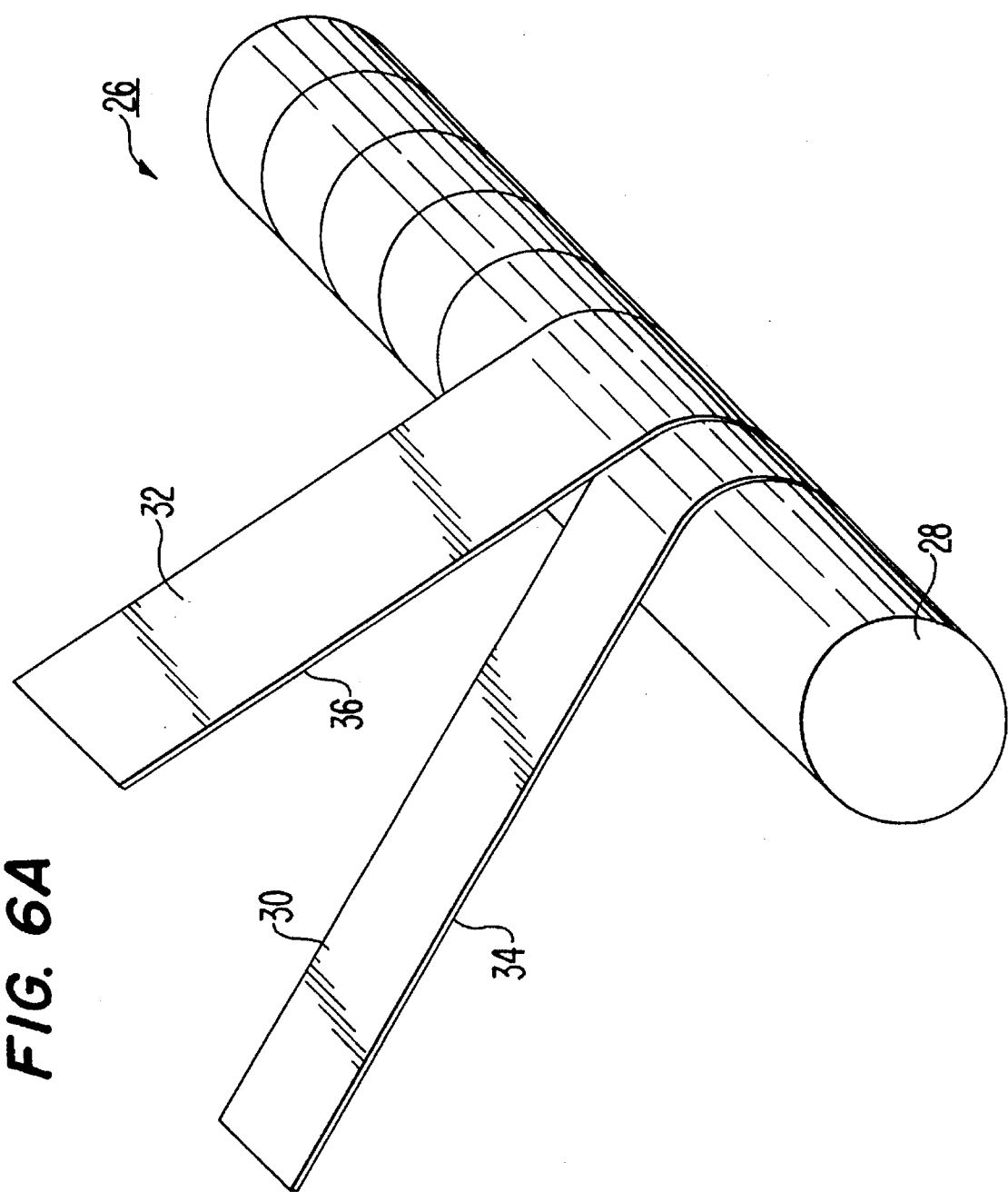
FIG. 6A is a three-quarter isometric view of cord gasket material of the present invention.
Figure 6B:
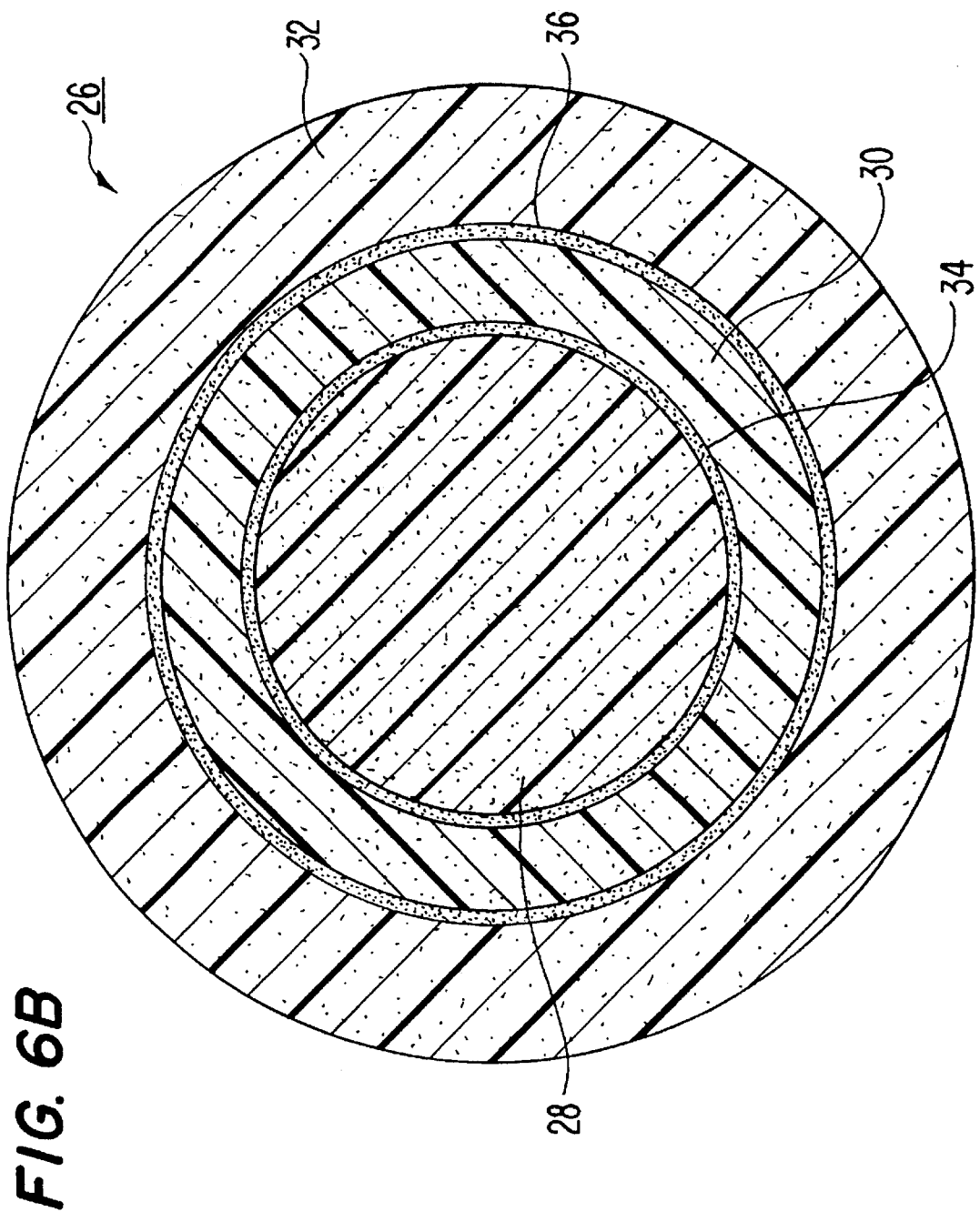
FIG. 6B is a cross section view of the cord gasket material of the present invention, with its wrapped layers shown in exaggerated size to illustrate detail.

Shown in FIG. 6A is another embodiment of a cord 26 of material of the present invention comprising a PTFE core material 28 wrapped in a film 30 and over-wrapped again with film 32. FIG. 6B is a cross section view of the cord 26 showing films 30 and 32 and adhesive layers 34 and 36 coated to the core 28 side of the films. The cord 26 may be further compressed and reshaped into other geometrical cross sections depending on the requirements of the specific flange configuration. This material may be handled and formed in the same manner described above.

A particularly preferred gasket for use in a flat-faced flange (e.g., for sealing distillation column sections) is illustrated in FIG. 7A. This gasket 38 comprises a core 40 coaxially wrapped in multiple layers of film, such as three inner films 42, 44, 46, and an outer film 48. Prior to installation on the core, preferred the inner films 42, 44, 46 are each about 2 mil thick and about 1 inch wide, and have a tensile strength of 212.7 MPa. The preferred inner films have a modulus of elasticity at 2% strain of about 7212 MPa. The outer film 48 is preferably "softer" to provide better conformability. Prior to installation this film 48 may comprise about 6 mil thick and 1.5 inches wide, with a tensile strength of about 19.9 MPa and a modulus of elasticity at 2% strain of about 590 MPa. Each of the films may include an adhesive layer 50, 52, 54, 56 to bond the films around the core.

To assist in positioning this gasket material during installation, it is preferred that a thin coating of adhesive be applied to the gasket material and/or the flange face. The ideal adhesive comprises a composite adhesive material comprising a pressure sensitive adhesive layer (e.g., rubber or acrylic) applied to either side of a woven or non-woven carrier sheet (e.g., MYLAR® polyester). The choice of adhesive is application specific and depends upon the chemical and temperature conditions under which the gasket is to be employed. The adhesive should have good holding properties against both expanded PTFE and metal. In most installed applications, the adhesive film is completely encased by the composite gasket and the flange face, and is not exposed to the process fluids.

The elongated PTFE core may contain a particulate filler. The term "particulate" is meant to include particles of any aspect ratio and thus includes particles, chopped fibers, whiskers, and the like. The particulate filler may be inorganic fillers which include metals, semi-metals, ceramics, carbon, graphite, and glass. Alternatively, the particulate filler may be an organic filler, which includes polymeric resins. Suitable resins include, for example, polyether ether ketone (PEEK), fluorinated ethylene propylene (FEP), copolymer of tetrafluoroethylene and perfluoro(propylvinyl ether)(PFA), and other similar high melting polymers.

Particulate fillers, when used, are selected to impart or enhance certain properties in the core or wrapping film according to the application in which the composite gasket material of the invention will be used. For example, they can be used to adjust or enhance properties such thermal expansion, electrical and thermal conductivity, and can also be used to modify compressibility and dimensional stability properties of the composite gasket material. Particulate fillers can be used in concentrations as high as 90 volume percent, but are more generally used in the concentration range 10–70 volume percent.

The particulate filler and PTFE fine powder may be combined using conventional dry mixing methods after which they can be formed to provide the core material of the invention by the process taught in U.S. Pat. No. 3,953,566 to Gore or U.S. Pat. No. 4,985,296 to Mortimer, incorporated by reference. Alternatively, the particulate filler may be mixed with PTFE in aqueous dispersion and coagulated together to form a wet mixture of solids. The water is removed from the mixture by standard drying methods and the mixture further processed in the same manner as dry mixed materials.

The high strength film wrap is preferably a porous expanded PTFE film as produced by the process taught in U.S. Pat. No. 3,953,566 to Gore. By stretching a paste-formed PTFE sheet in one or more directions, a porous expanded polytetrafluoroethylene film having high strength is produced. The high strength porous PTFE film may be made by stretching uniaxially, either in longitudinal or transverse direction; or biaxially, in both longitudinal and transverse directions, sequentially or simultaneously. The film is preferably uniaxially stretched in the longitudinal direction an amount in the range 2:1 to 150:1, more preferably an amount in the range 2:1 to 80:1.

Longitudinal direction as used herein indicates the planar direction of manufacture of the film; transverse direction indicates the planar direction normal to the direction of manufacture.

Ideally, the high strength PTFE film is a composite film comprising a high strength porous expanded PTFE film adhered to a thin layer of melt-processable thermoplastic fluoropolymer. By thin is meant a thickness of 30 micrometers or less, preferably 20 micrometers or less, and more preferably 10 micrometers or less. The expanded layered composite film is produced in the following manner.

PTFE fine powder, which may be combined with the same particulate filler materials and prepared as described above, is mixed with a hydrocarbon extrusion aid, usually an odorless mineral spirit, to form a paste. The paste is compressed into a billet and subsequently extruded through a die in a ram-type extruder to form a coherent planar sheet. The coherent PTFE sheet, with or without particulate filler materials, is optionally calendered and then dried by volatilizing the hydrocarbon extrusion aid with heat. Evaporation of the hydrocarbon extrusion aid results in the PTFE sheet having a small degree of porosity. The resulting porous PTFE sheet is now ready to be combined with a melt-processable thermoplastic fluoropolymer film and the combined sheets expanded together. However, if a highly porous expanded PTFE film is desired, the porous PTFE sheet may be preliminary expanded by stretching it at 200°–300° C. about 1.5 to 5 times its original length prior to combining it with the melt-processable thermoplastic fluoropolymer.

The porous PTFE sheet is combined with the melt-processable thermoplastic fluoropolymer film by placing the melt-processable film on the porous PTFE sheet and heating the combination to a temperature between the melt point of the melt-processable fluoropolymer and 365° C. The porous PTFE sheet is kept under tension when heated thereby maintaining its dimensions while the melt-processable fluoropolymer layer is combined with it. As the porous PTFE sheet is heated to a temperature above the melt point of the melt-processable fluoropolymer layer, the melt-processable fluoropolymer layer in contact with the porous PTFE sheet at least partially melts and flows onto the surface of the porous PTFE sheet thereby forming a composite precursor, i.e., a coated porous PTFE sheet ready to be expanded.

The coated porous PTFE sheet may be expanded according to the method taught in U.S. Pat. No. 3,953,566 to Gore. The temperature range at which expansion of the coated porous PTFE sheet is performed is between a temperature at or above the melt point of the melt-processable thermoplastic fluoropolymer layer and a temperature at or below the melt point of PTFE. The coated porous PTFE sheet may be stretched uniaxially, either in a longitudinal or transverse direction; or biaxially, in both longitudinal and transverse directions, sequentially or simultaneously. It may be stretched in one or more steps.

The coated porous PTFE sheet forms a porous expanded PTFE film as it is stretched. The expanded PTFE film is characterized by a series of nodes interconnected by fibrils. As the coated porous PTFE sheet is expanded to form the high strength porous expanded PTFE film, the melt-processible thermoplastic fluoropolymer layer adhered to it is carried along the surface of the expanding sheet while in a melted state, thereby becoming progressively thinner and forming a thin melt-processable thermoplastic fluoropolymer layer on the porous expanded PTFE sheet. The thin melt-processible fluoropolymer layer has a thickness of 30 micrometers or less. The thin melt-processable fluoropolymer layer preferably has a thickness of one half, more preferably one tenth, of the thermoplastic fluoropolymer film's original thickness. For example, a thermoplastic fluoropolymer film originally having a thickness of 25.4 micrometers (1 mil) could produce a thin thermoplastic fluoropolymer layer having a thickness as low as about 2.5 micrometers (0.1 mil) or less after expansion of the porous PTFE sheet into the porous expanded PTFE article.

The means for heating the porous expanded PTFE sheet may be any means for heating commonly known in the art including, but not limited to, a convection heat source, a radiant heat source or a conduction heat source. The conduction heat source may be a heated surface such as a heated drum, roll, curved plate, or die. When a conduction heat source is used as the means for heating the coated porous expanded PTFE sheet, the uncoated surface of the sheet should be against the conduction heat source so to prevent sticking and melting of the melt-processable fluoropolymer layer upon the conduction heat source.

Thermoplastic fluoropolymers which are of utility as the melt-processable thermoplastic fluoropolymer layer have melt points of 342° C. or less. They include copolymer of tetrafluoroethylene and hexafluoropropylene (FEP), copolymer of tetrafluoroethylene and perfluoro(propylvinyl ether-)(PFA), homopolymers of polychlorotrifluoroethylene (PCTFE) and its copolymers with TFE or VF2, ethylene-chlorotrifluoroethylene (ECTFE) copolymer, ethylene-tetrafluoroethylene (ETFE), polyvinylidene fluoride (PVDF), and polyvinylfluodde (PVF). Thermoplastic fluoropolymers are preferred as the melt-processable thermoplastic fluoropolymer since they are similar in nature to PTFE, having melt points near the lowest crystalline melt point of PTFE, and therefore are relatively high temperature thermoplastic polymers. Thermoplastic fluoropolymers are also relatively inert in nature and therefore exhibit resistance to degradation from many chemicals.

When applied under sufficient temperature and/or pressure, the melt-processable thermoplastic fluoropolymer film can act as an adhesive to adhere the high strength porous expanded PTFE film to the surfaces of other materials.

The expanded layered composite film is wrapped on the core of elongated PTFE so that the thin layer of melt-processable thermoplastic fluoropolymer contacts the core of elongated polytetrafluoroethylene. The composite film layer is then heated to cause the thin layer of melt-processable thermoplastic fluoropolymer to at least partially melt and adhere to the core of elongated PTFE core and/or the previous layer of film.

The PTFE film may be wrapped on the core in any desired manner. For instance, the film can be wrapped on the core helically so that the film forms a helical seam on the composite gasket material. Alternatively, the high strength film may be wrapped on the core in a longitudinal manner so that the film forms a longitudinal seam on the composite gasket material.

While the film may be wrapped on the core by hand, it is preferred that the wrapping is accomplished through the use of high-speed mechanical wrapping apparatus, such as a conventional tape-wrap machine used to wrap dielectric tape layers on conductors. One such machine is disclosed in U.S. Pat. No. 3,756,004 to Gore. The tape wrap machine applies a degree of back tension to the high strength film as it wraps it in a helical fashion around the core which applies a compressive force to the core and thereby somewhat densifies the core in the process. The degree of back tension applied to the high strength film may be varied so that the density of the core and final dimensions of the assembly may be controlled. Ideally, a sufficiently tight wrap is applied so as to limit "creep" of the core material when placed under compressive force once installed. In fact, it is the design and control of film tension, core density, and circumference during gasket manufacture and installation that gives rise to the outstanding compressive creep resistance of the gasket of the present invention.

Densification (i.e., reduction in porosity) of the core results in no change to the tensile strength or tensile modulus properties which were developed in it by the expansion process. However, densification has a substantial effect on the flex and compressive characteristics of the material. By partially densifying the core and then constraining it by wrapping it with the high strength film, control over the amount of deformation required to densify it fully when in service can be exercised. In other words, a composite gasket material is produced such that a compressive load sufficient to provide an excellent seal can be applied to the composite gasket material with relatively little movement together of the sealing surfaces. Thus, the composite gasket material of the invention can provide and maintain a much thicker gasket, as required in O-ring and standing gap flanges, that covers a much smaller sealing surface area than can be obtained from existing PTFE gasket materials having lower density and the tendency to cold flow. Further, for a flat faced flange applications the composite gasket constructions can minimize compressive creep and thinning under constant flange pressure.

The desired properties of the final gasket may include conformabilty to uneven surfaces such as waviness frequently found in glass flanges or seams located on a heterogeneous flange surface. Gasket conformability, creep resistance and low stress to seal properties may be achieved by compression, wrapping, calendaring, reducing, forming or shaping in the construction of the composite gasket. Densification may be imparted at any of these steps. These tasks can be performed in any order necessary to produce the desired result. For example, a core may be compressed while being wrapped and later calendered and shaped. Further, the core may then be wrapped with a final layer of softer conformable tape. Alternatively, a core can be formed and compressed, then wrapped and finally shaped. Further, the gasket may be partially compressed before use, such that the desired compressive load can be applied during installation and use. Many means can be used in these processes including, but not limited to, wrapping machines, platen presses, grooved or flat calendar rolls, and reducing or forming dies. Through these many controls, gasket properties such as shape dimensions and density can be managed to affect the final performance characteristics of the gasket.

The high strength porous expanded PTFE film wrapped upon the elongated PTFE core imparts a substantially increased measure of circumferential strength and restraint to the PTFE core. The result is a composite gasket material with a reduced tendency to creep (i.e., a gasket material that has much greater resistance to becoming thinner and wider under steady compressive loads when compared to a PTFE gasket without the high strength film wrap).

Alternatively, additional porous expanded PTFE films, which likewise may be coated with a melt-processable thermoplastic fluoropolymer as described above, may be wrapped upon the first high strength film. Additional film wraps can have tensile properties which provide additional strength and creep resistance to the composite gasket material or, alternatively, can have softer films, characterized by lower tensile strength and tensile modulus properties than previous film wraps, in order to enhance sealing and surface conformability of the gasket material.

The following examples disclosing processes and products according to the present invention are illustrative only and are not intended to limit the scope of the present invention in any way.

TEST DESCRIPTIONS

TENSILE TEST

To determine the tensile properties of the high strength porous expanded polytetrafluoroethylene film, a 2.54 cm (1.0 inch) wide by 20.3 cm (8.0 inches) long sample of the film is obtained. Thickness of the film is determined with a snap micrometer gauge and width of the film is determined with a linear gauge. A constant rate-of-jaw-separation machine (Instron testing machine, Model 1122) is used to test samples to break. The gauge length of the specimen is 10.16 cm (4.0 inches). The strain rate employed is 2.54 cm/min (1.0 inch/min). Samples are tested to break. The tensile modulus at 2% extension and maximum stress are calculated and recorded as described in ASTM Standard Test Method D 88-291.

A population of five to eight samples is averaged to give each value listed herein.

GASKET FLOW TEST

Two sections of gasket material each 12.7 cm (5 inches) in length are obtained. The samples are mounted, in parallel alignment approximately 20 cm (8 inches) apart, between two 25.4 cm (10 inches) square rigid flat platens. An initial compressive load of 8.01 kN/linear cm (1800 lbf/linear in) is applied to the samples. The samples remain compressed for a period of 10 minutes at a temperature of 200° C. The compressive load is reduced by creep of the samples during the 10 minute compression period. No effort is made to maintain a constant load.

At the end of the compression period the samples are recovered and the distance around the perimeter ($P_f$) of the compressed sample is measured (in a direction perpendicular to the long axis of the sample). The $P_f$ measurement is compared to an initial perimeter measurement ($P_i$) of the sample taken in like manner prior to testing and the increase reported as Gasket Flow (GF) according to the formula:

$$GF, \text{percent} = (P_f - P_i / P_i) \times 100$$

EXAMPLE 1

A composite gasket material of the instant invention was produced in the following manner:

A 0.0127 mm (0.5 mil) FEP tape (50A available from E. I. duPont de Nemours & Co.) was laminated to a porous PTFE sheet through the introduction of enough heat to melt and attach the FEP sheet to the porous PTFE sheet as follows:

The combined sheets were first longitudinally stretched an amount 1.5:1 at a temperature of approximately 330° C. over a heated curved platen, and then further longitudinally stretched an amount 1.5:1 in a second heated zone at a temperature of approximately 340° C., thus forming a high strength composite film having a total amount of expansion of 2.25:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.7 mm (0.46 inch).

The result was a composite gasket material of the instant invention.

Tensile properties of high strength composite film prepared as described in Example 1 were tested as described above. Tensile strength was 19.87 MPa (2882 psi) and 2% secant tensile modulus was 589.7 MPa (85520 psi). The composite gasket material of Example 1 was tested by the Gasket Flow Test described above and the results shown in Table 1.

EXAMPLE 2

A second example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. The high strength composite film was wrapped so that ½ of the film was overlapped on the previously applied wrap.

Prior to wrapping the porous expanded polytetrafluoroethylene beading had a density of about 0.3 g/cc and an outside diameter of 17.8 mm (0.70 inch). Back tension was applied on the composite film so that when the wrapping of the beading was completed, the outside diameter of the wrapped beading was reduced to 13.7 mm (0.54 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 13.3 mm (0.52 inch).

The result was a composite gasket material of the instant invention.

Tensile properties of high strength composite film prepared as described in Example 2 were tested as described above. Tensile strength was 173.7 MPa (25200 psi) and 2% secant tensile modulus was 5838 MPa (846700 psi). The composite gasket material of Example 2 was tested by the Gasket Flow Test described above and the results shown in Table 1.

EXAMPLE 3

A third example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 20:1 in a second heated zone at a temperature of approximately 340° C., thus forming a high strength composite film having a total amount of expansion of about 76:1. The composite film was subsequently heated at a temperature of 335° C. in a third heated zone at a stretch ratio of 1:1 so that no additional expansion occurred.

Subsequently, the composite film was slit lengthwise and helically wrapped upon a core of polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

A second layer of the high strength composite film was wrapped upon the wrapped gasket material described above and amorphously locked as the previously applied first layer. Back tension was applied on the composite film so that when the wrapping of the beading was completed, the outside diameter of the wrapped beading was reduced to 11.9 mm (0.47 inch).

The result was a composite gasket material of the instant invention.

Tensile properties of high strength composite film prepared as described in Example 3 were tested as described above. Tensile strength was 212.7 MPa (30850 psi) and 2% secant tensile modulus was 7212 MPa (1046000 psi). The composite gasket material of Example 3 was tested by the Gasket Flow Test described above and the results shown in Table 1.

EXAMPLE 4

A fourth example of the composite gasket material of the instant invention was produced in the following manner:

A 0.0254 mm (1.0 mil) FEP tape (100 A available from E. I. duPont de Nemours & Co.) was laminated to a porous PTFE sheet, which had been preliminarily stretched an amount 1.9:1 at a temperature of about 250° C., through the introduction of enough heat to melt and attach the FEP sheet to the porous PTFE sheet as follows:

The combined sheets were first longitudinally stretched an amount 2:1 at a temperature of approximately 330° C. over a heated curved platen, and then further stretched an amount 10:1 in a second heated zone at a temperature of approximately 340° C., thus forming a high strength composite film having a total amount of expansion of about 38:1. The composite film was subsequently heated at a temperature of 335° C. in a third heated zone at a stretch ratio of 1:1 so that no additional expansion occurred.

Subsequently, the composite film was slit lengthwise and helically wrapped upon a core of porous expanded polytetrafluoroethylene beading that had not been previously subjected to an amorphous locking process. Prior to wrapping the porous expanded polytetrafluoroethylene beading had a density of about 0.3 g/cc and an initial outside diameter of 17.8 mm (0.7 inch).

The high strength porous expanded polytetrafluoroethylene film in the form of the composite film was wrapped so that ½ of the film was overlapped on the previously applied wrap. Back tension was applied on the composite film so that when the wrapping of the beading was completed, the outside diameter of the wrapped beading was reduced to 12.2 mm (0.48 inch).

The wrapped beading was passed through an oven at about 405° C. to amorphously lock the high strength expanded polytetrafluoroethylene film and to melt the FEP layer, thus adhering the composite film to the porous expanded polytetrafluoroethylene beading.

The result was a composite gasket material of the instant invention.

Tensile properties of high strength composite film prepared as described in Example 4 were tested as described above. Tensile strength was 212.7 MPa (30850 psi) and 2% secant tensile modulus was 7212 MPa (1046000 psi). The composite gasket material of Example 4 was tested by the Gasket Flow Test described above and the results shown in Table 1.

Comparative Examples 1

For comparative purposes a section of commercially available wrapped porous polytetrafluoroethylene gasket material, Inertex ⅜" Valve Stem Packing, was obtained and tested as described in the examples above. A section of the tape wrapped around the core was unwound and samples were given the tensile test as described above except that the sample width was ½ inch. The results are also shown in Table 1.

TABLE 1

| Example | Film Tensile Strength (MPa) | Film Modulus @ 2% strain (MPa) | Gasket Flow (%) |
| --- | --- | --- | --- |
| 1 | 19.9 | 590 | 70 |
| 2 | 173.4 | 5838 | 15 |
| 3 | 212.7 | 7212 | 29 |
| 4 | 173.4 | 5838 | 40 |
| Comp. Ex. 1 | 6.6 | 79 | 137 |

As should be evident from the above examples, the basic film wrapped material of the present invention provides a very distinct improvement over PTFE sealing materials and thus can be effectively utilized as free standing gaskets or pre-formed loops, such as previously described.

EXAMPLE 5

The gasket 38 shown in FIG. 7A was constructed in the manner described below.

First, with respect to inner tapes 42, 44, and 46, a 0.0254 mm (1.0 mil) FEP tape (100 A available from E. I. duPont de Nemours & Co.) was laminated to a porous PTFE sheet to form adhesive layers 50, 52, and 54. The PTFE sheet had been preliminary stretched an amount 1.9:1 at a temperature of about 250° C., through the introduction of enough heat to melt and attach the FEP sheet to the porous PTFE sheet to form composite film tapes 42, 44, and 46 as follows:

The combined sheets were first longitudinally stretched an amount 2:1 at a temperature of approximately 330° C. over a heated platen, and then further stretched an amount 20:1 in a second heated zone at a temperature of approximately 340° C., thus forming a high strength composite film having a total amount of expansion of about 76:1. The composite film was subsequently heated at a stretch ratio of 1:1 so that no additional expansion occurred.

The composite film was then slit lengthwise and helically wrapped upon a an porous, expanded polytetrafluoroethylene (PTFE) core 40 in the form of a beading that had not been previously subjected to an amorphous locking process ("sintering"). Prior to wrapping, the expanded PTFE core was essentially cylindrical in shape and had a density of about 0.3 g/cc and diameter of 17.8 mm (0.7 in). The core was calendered (densified and shaped) to a rectangular cross section 20 mm×4 mm (0.79 in×0.16 in) and a density of about 1.2 g/cc.

A first layer of the high strength porous expanded PTFE composite film 42 was wrapped so that ½ of the film was overlapped on the previously applied wrap. The back tension applied on the composite film was controlled so that the film wrapped tightly around the calendered core 40 without changing the core's density or shape.

The wrapped core was passed through an oven at about 405° C. to amorphously lock the high strength expanded polyterafluoroethylene film and to melt the FEP layer, thus adhering the composite film to the porous expanded polytetrafluoroethylene beading.

Two additional layers of the high strength composite film 44, 46 were then wrapped upon the wrapped calendered core and amorphously locked as the previously applied first layer. These additional layers were also wrapped so as not to change the shape or density of the core.

A 0.0127 m (0.5 mil) FEP tape 56 (50 A available from E. I. DuPont de Nemours & Co.) was then laminated to a porous PTFE sheet 48, which had been preliminary stretched an amount 1.9:1 at a temperature of about 250° C., through the introduction of enough heat to melt and attach the FEP sheet to the porous PTFE sheet as follows:

The combined sheets were first longitudinally stretched an amount 1.5:1 at a temperature of approximately 330° C. over a heated platen, and then further stretched an amount 1.5:1 in a second heated zone at a temperature of approximately 340° C., thus forming a high strength composite film having a total amount of expansion of about 2.25:1. The composite film was subsequently heated at a stretch ratio of 1:1 so that no additional expansion occurred.

Subsequently, the composite film was slit lengthwise and helically wrapped upon the previously wrapped core 40 from above. The high strength composite film 48 was wrapped so that ¾ of the film was overlapped on the previously applied wrap. The tension on this fourth and final wrap was also controlled as to not change the shape or density of the core.

This wrapped beading was passed through an oven at about 405° C. to amorphously lock the expanded PTFE film and to melt the FEP layer, thus adhering the composite film to the previously wrapped beading.

The wrapped core was then calendered to a rectangular cross section 20 mm×4 mm (0.79 in×0.16 in) and a density of about 1.6 g/cc.

The gasket material 38 was then skive cut at both ends and joined to form a loop. This joint was wrapped with the high strength composite film expanded 76:1 and then with the high strength composite film expanded 2.25:1 to facilitate sealability and conformability. These wraps of composite film were then heat set in a mold press to melt the FEP layer, thus adhering the composite film to the joint area. This joined gasket was a ring with a 3000 mm (118.1 in) inside diameter and a 3040 mm (119.7 in) outside diameter.

The resulting composite gasket 38 of the instant invention was particularly suitable for use in a flat face flange 58, such as that shown in FIG. 8A. The flange assembly 58 comprises flanges 60a, 60b, each including an elastomeric liner 62a, 62b approximately 4 mm (0.16 in) thick. A first gasket 38a is placed on top of one flange sealing face 64. A polypropylene ring 66 is placed on top of the gasket 38a and a second gasket 38b is placed on top of the polypropylene ring 66. The second half of the flange 60a is then placed on top of the second gasket, with flange sealing face 68 in contact with gasket 38b. The flange joint may then be sealed in a conventional manner, with each of the gaskets 38a, 38b place under the full compressive load between the flat sealing faces.

This gasket construction is particularly suitable for use in harsh chemical environments, such as in distillation columns. The combined chemical resistance of polyterafluoroethylene and resistance to compressive creep under constant flange pressure provided by the present invention assures that gasket integrity and sealability is maintained during use. By contrast, a conventional elastomer gasket used in this application would not maintain its seal in the presence of HCl, chlorine gasses, or similar chemicals, especially at elevated temperatures. However, a composite gasket of the present invention will resist chemical attack as well as creep to provide an effective and long-lasting seal.

EXAMPLE 6

Figure 7B:
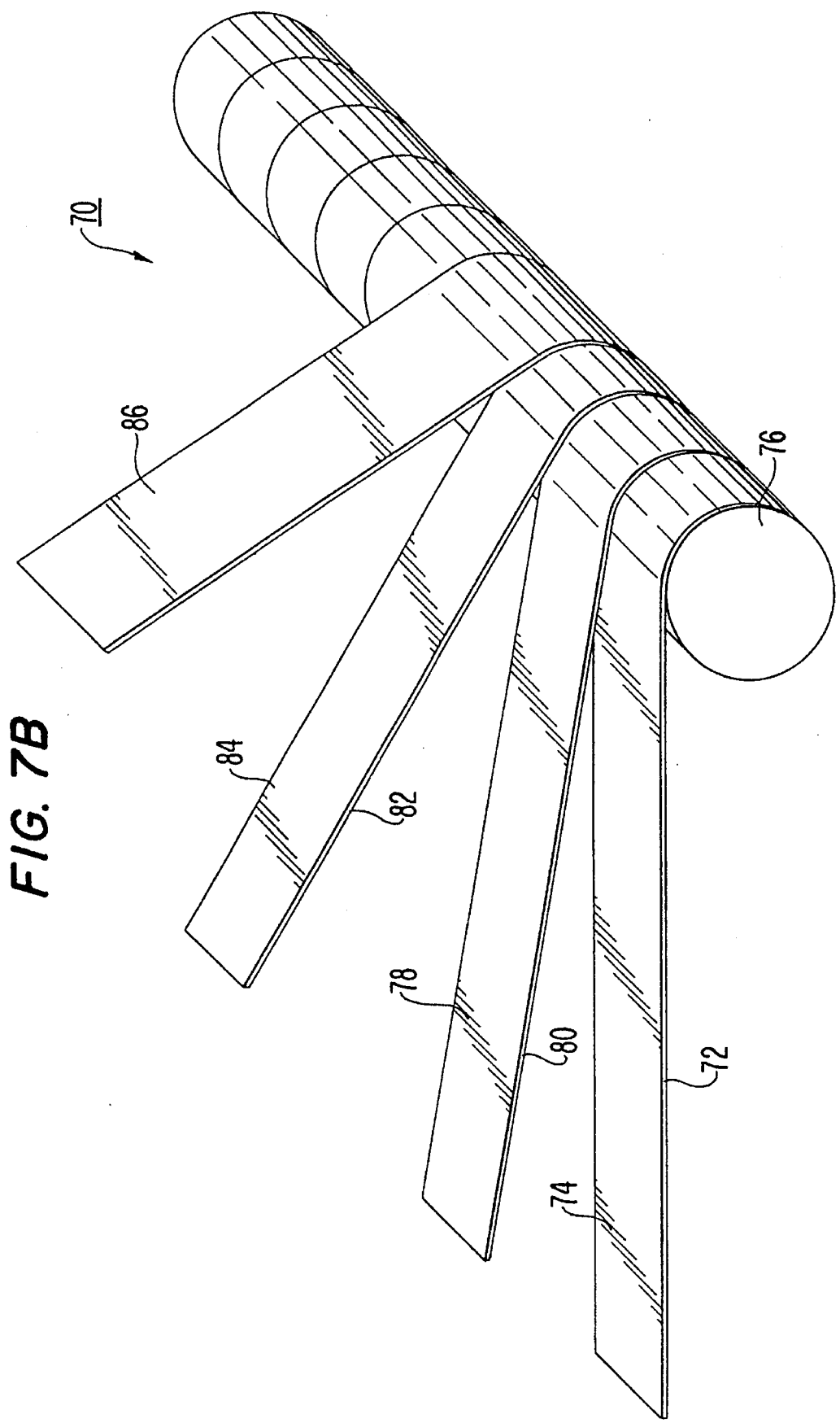
FIG. 7B is a three-quarter isometric view of another embodiment of a gasket of the present invention.

Another example of a composite gasket 70 of the present invention is shown in FIG. 7B. The gasket 70 was produced in the following manner:

A 0.0254 mm (1.0 mil) FEP tape 72 (100 A available from E. I. DuPont de Nemours & Co.) was laminated to a porous PTFE sheet, which had been preliminary stretched an amount 1.9:1 at a temperature of about 250° C., through the introduction of enough heat to melt and attach the FEP sheet to the porous PTFE sheet to form a composite film 74 as follows:

The combined sheets were first longitudinally stretched an amount 2:1 at a temperature of approximately 330° C. over a heated curved platen, and then further stretched an amount 20:1 in a second heated zone at a temperature of approximately 340° C., thus forming a high strength composite film having a total amount of expansion of about 76:1. The composite film 74 was subsequently heated at a stretch ratio of 1:1 so that no additional expansion occurred.

Subsequently, the composite film 74 was slit lengthwise and helically wrapped upon a core 76 of porous, expanded polytetrafluoroethylene (PTFE) beading that had not been previously subjected to an amorphous locking process. Prior to wrapping the core 76 had a density of about 0.5 g/cc and an initial diameter of 24.1 mm (0.95 in).

The high strength composite film 74 was wrapped so that ½ of the film was overlapped on the previously applied wrap. Back tension was applied on the composite film so that when the wrapping of the core 76 was completed, the outside diameter of the wrapped core was reduced to 16.8 mm (0.66 in).

The wrapped core 76 was passed through an oven at about 450° C. to amorphously lock the expanded PTFE film 74 and to melt the FEP layer 72, thus adhering the composite film to the core.

A second layer of the high strength composite film 78, including an FEP layer 80, was prepared in the same manner described above and wrapped upon the wrapped core 76. The twice-wrapped core 76 was again placed in an oven at 405° C., as described above, to amorphously lock the second PTFE film 78 and bond the film to the wrapped core 76. This second layer of film 78 was wrapped so as not to change the shape or density of the previously wrapped beading.

A 0.0127 m (0.5 mil) FEP tape 82 (50 A available from E. I. duPont de Nemours & Co.) was then laminated to a porous PTFE sheet, which had been preliminary stretched an amount 1.9:1 at a temperature of about 250° C., through the introduction of enough heat to melt and attach the FEP sheet to the porous PTFE sheet to form a compose film 84 as follows:

The combined sheets were first longitudinally stretched an amount 1.5:1 at a temperature of approximately 330° C. over a heated platen, and then further stretched an amount 1.5:1 in a second heated zone at a temperature of approximately 340° C., thus forming a high strength composite film having a total amount of expansion of about 2.25:1. The composite film 84 was subsequently heated at a stretch ratio of 1:1 so that no additional expansion occurred.

Subsequently, the composite film 84 was slit lengthwise and helically wrapped upon the previously wrapped calendered core 76 from above. The high strength composite film 84 was wrapped so that ¾ of the film was overlapped on the previously applied wrap. The tension on this wrap was also controlled as to not change the shape or density of the previously wrapped core.

This wrapped beading was passed through an oven at about 450° C. to amorphously lock the high strength expanded polyterafluoroethulene film 84 and to melt the FEP layer 82, thus adhering the composite film 84 to the previously wrapped beading.

A second layer of this latter composite film 86 was then wrapped upon the thrice wrapped calendered core 76 in the manner previously described and heated to amorphously lock and adhere the film 86 to the core 76. This additional layer was also wrapped so as not to change the shape or density of the previously wrapped beading.

The gasket material was then skive cut at both ends and joined to form a loop. This joint was wrapped with the high strength composite film expanded 76:1 and then with the high strength composite film expanded 2.25:1. These wraps of composite film were then heat set in a mold press to melt the FEP layer, thus adhering the composite film to the joint area. This joined gasket was a ring (circular cross-section) with a 1070 mm (42.1 in) diameter. The ring was then calendered in a shaped die to form the desired gasket cross section and to increase the density of the gasket, thereby reducing the final stress to seal with the glass lined flange surfaces.

Figure 8B:
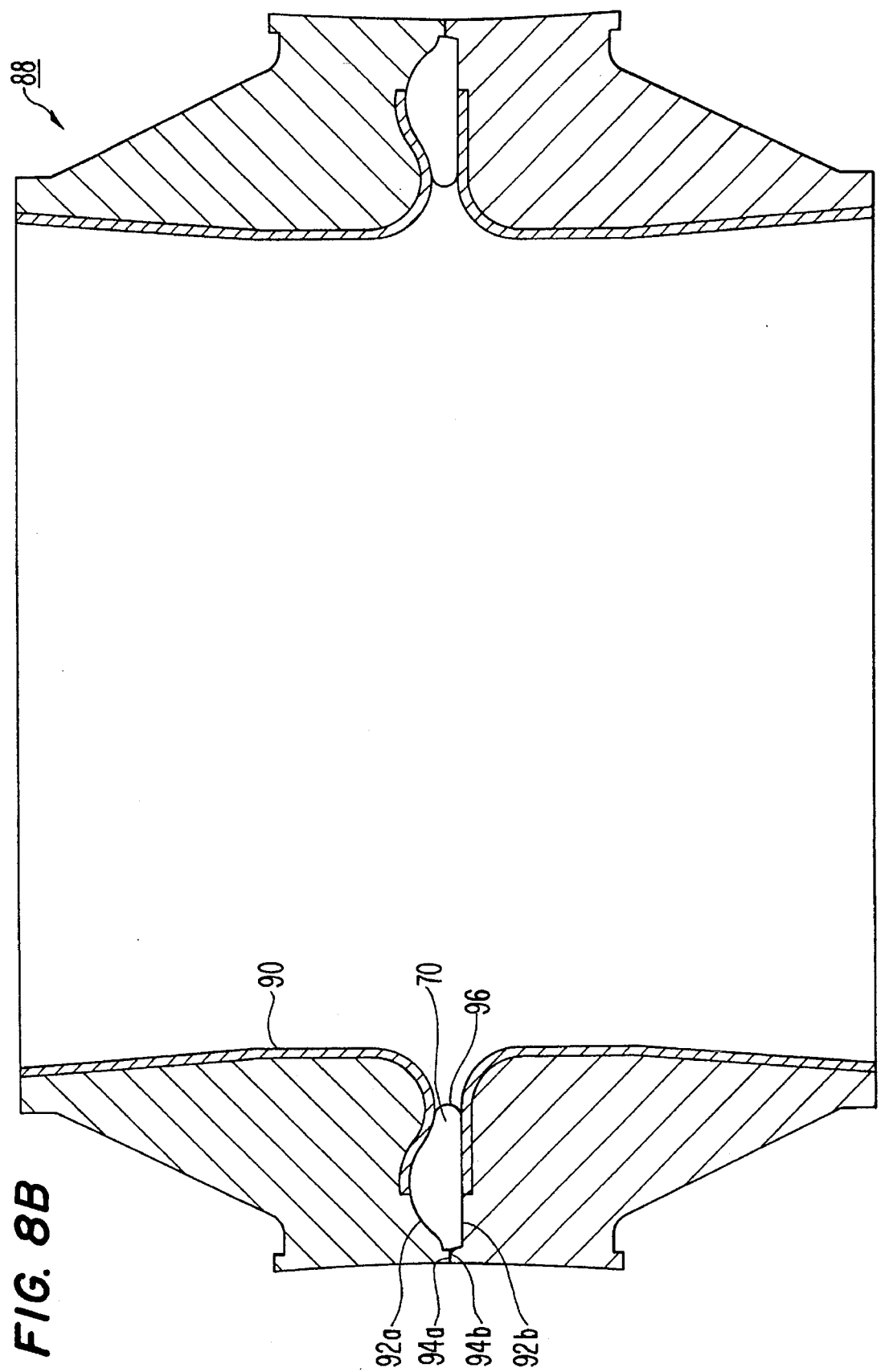
FIG. 8B is a cross section view of a standing gap flange with heterogeneous flange surfaces and employing the gasket depicted in FIG. 7B.

The result was a composite gasket material of the instant invention suitable for use in a standing gap flange 88, such as that shown in FIG. 8B. In the flange 88 illustrated, a glass liner 90 is provided to protect the remainder of the flange components from chemical attack (e.g., metal or plastic). The gasket 70 is placed between flange sealing faces 92a, 92b and sealed within the joint. As can be seen, when the flange is sealed, a portion 94a, 94b of each of the flange sealing faces are in direct contact with one another, limiting the amount of compressive force the gasket 70 must withstand and constraining the gasket from creep in that direction. However, the gasket 70 remains exposed on its opposite face 96, where creep could occur if the gasket were made from conventional PTFE or similar material.

A composite gasket of the present invention is quite beneficial in this application because of the conformability of the gasket and low stress required to seal. The composite gasket will fill in the deformations and roughness inherent in glass linings and conform to the mating seams between heterogeneous materials in the flange face. With the added features of chemical compatibility and resistance to creep, this composite gasket provides a solution to this difficult sealing problem.

EXAMPLE 7

Another example of a composite gasket 98 of the present invention is shown in FIG. 7C and was produced in the following manner:

A 0.0254 mm (1.0 mil) FEP tape 100 (100 A available from E. I. duPont de Nemours & Co.) was laminated to a porous PTFE sheet, which had been preliminary stretched an amount 1.9:1 at a temperature of about 250° C., through the introduction of enough heat to melt and attach the FEP sheet to the porous PTFE sheet to form a composite film 102 as follows:

The combined sheets were first longitudinally stretched an amount 2:1 at a temperature of approximately 330° C. over a heated platen, and then further stretched an amount 20:1 in a second heated zone at a temperature of approximately 340° C., thus forming a high strength composite film having a total amount of expansion of about 76:1. The composite film 102 was subsequently heated at a stretch ratio of 1:1 so that no additional expansion occurred.

Subsequently, the composite film 102 was slit lengthwise and helically wrapped upon a core 104 of porous, expanded polytetrafluoroethylene beading that had not been previously subjected to an amorphous locking process. Prior to wrapping the core 104 had a density of about 0.4 g/cc and an initial diameter of 15.0 mm (0.59 in).

The high strength composite film 102 film was wrapped so that ½ of the film was overlapped on the previously applied wrap. Back tension was applied on the composite film so that when the wrapping of the core was completed, the outside diameter of the wrapped core was reduced to 11.4 mm (0.45 in).

The wrapped core 104 was passed through an oven at about 450° C. to amorphously lock the composite film 102 and to melt the FEP layer 100, thus adhering the composite film to the porous expanded polytetrafluoroethylene core 104.

Two additional layers of identical high strength composite film 106, 108 were then wrapped upon the previously wrapped core 104 and amorphously locked as the previously applied first layer. These additional layers were wrapped so as not to change the shape or density of the core 104.

A 0.0127 m (0.5 mil) FEP tape 110 (50 A available from E. I. DuPont de Nemours & Co.) was laminated to a porous PTFE sheet, which had been preliminary stretched an amount 1.9:1 at a temperature of about 250° C., through the introduction of enough heat to melt and attach the FEP sheet to the porous PTFE sheet to form a composite film 112 as follows:

The combined sheets were first longitudinally stretched an amount 1.5:1 at a temperature of approximately 330° C. over a heated curved platen, and then further stretched an amount 1.5:1 in a second heated zone at a temperature of approximately 340° C., thus forming a high strength composite film having a total amount of expansion of about 2.25:1. The composite film was subsequently heated at a stretch ratio of 1:1 so that no additional expansion occurred.

Subsequently, the composite film 112 was slit lengthwise and helically wrapped upon the previously wrapped core 104 from above. The high strength composite film 112 was wrapped so that ¾ of the film was overlapped on the previously applied wrap. The tension on this wrap was also controlled as to not change the shape or density of the previously wrapped beading resulting in a composite gasket 98 with and outside diameter of 11.7 mm (0.46 in).

This wrapped beading was passed through an oven at about 405° C. to amorphously lock the composite film 112 and to melt the FEP layer 110, thus adhering the composite film to the previously wrapped core 104.

The wrapped core 104 was then calendered to a rectangular cross section 11.7 mm×8.1 mm (0.46 in×0.32 in) and a density of about 1.1 g/cc.

The gasket material was then skive cut at both ends and joined to form a loop. This joint was wrapped with three layers of high strength composite film expanded 76:1 and then with one layer high strength composite film 21 expanded 2.25:1. These wraps of composite film were then heat set in a mold press to melt the FEP layer, thus adhering the composite film to the joint area. This joined gasket was a ring (circular cross-section) with a 197 mm (7.75 in) diameter.

This completed composite gasket 98 is particularly suitable for use in an O-ring groove flange application, such as that previously illustrated and described with respect to FIGS. 4 and 5. In these applications, the composite gasket of the present invention is beneficial because of its conformability, retention of shape, creep resistance, and chemical and UV resistance. Neoprene gaskets commonly employed in these applications are not conformable enough to offset the misalignment present in older flanges, such as in those found in transformer radiators. Neoprene may also be attacked by other substances in these environments, such as transformer oil. The composite gasket of the present invention will conform to the misaligned flanges and resist attack from the transformer oil and UV radiation, providing a long-lasting seal.

In all applications; the gasket material of the present invention provides significant improvements in the durability, conformability, longevity, chemical and thermal resistance, and ease of installation of gasket material. Another chief advantage of the present invention is its ability to provide a thick or thin, low creep, pure fluorocarbon sealant that can be formed into a variety of gasket shapes and sizes. This provides far more utility and flexibility over many previous fluorocarbon gaskets which required cutting from a sheet. While the present invention is somewhat similar to fluorocarbon joint sealant in its moldability, it has significantly better creep properties and higher maintained stresses with thick cross-section gaskets. As a pre-formed gasket, the present invention also eliminates positioning and mis-installation problems.

While particular embodiments of the present invention have been illustrated and described herein, the present invention should not be limited to such illustrations and descriptions. It should be apparent that changes and modifications may be incorporated and embodied as part of the present invention within the scope of the following claims.

The invention claimed is:

1. A gasket material for sealing a fluid connection in an apparatus, which gasket material comprises:

a core of elongated polytetrafluoroethylene (PTFE);

means to constrain the core from lateral flow when the core is placed under compressive pressure to establish and maintain a fluid seal, the means comprising a film wrap around the PTFE core to form a sealant of sufficient strength to limit creep of the PTFE core when the gasket is placed under pressure.

2. The gasket material of claim 1 wherein the gasket material is tightly wrapped in a film of expanded PTFE.

3. The gasket material of claim 2 wherein the expanded PTFE film is coated with a layer of melt-processible thermoplastic fluoropolymer.

4. The gasket material of claim 1 wherein the gasket material is connected to itself to form a continuous ring.

5. The gasket material of claim 1 wherein the gasket material comprises a cord of material which can be cut to size and installed within the fluid connection.

6. The gasket material of claim 1 wherein the gasket material comprises a pre-shaped pattern adapted to be directly installed within the apparatus.

7. The gasket material of claim 1 wherein the gasket material includes an adhesive layer on at least one side to assist in retaining the gasket material in place within the apparatus.

8. The gasket material of claim 7 wherein the adhesive layer comprises a pressure sensitive adhesive.

9. The gasket material of claim 8 wherein the pressure sensitive adhesive is applied to a carrier sheet.

10. The gasket material of claim 1 wherein the elongated PTFE core comprises expanded PTFE; and the film comprises expanded PTFE coated with a melt processible thermoplastic fluoropolymer.

11. The gasket material of claim 1 wherein the gasket material readily releases from the fluid connection after it has been fully compressed within it.

12. The gasket material of claim 1 wherein more than one film is wrapped around the core.

13. The gasket material of claim 12 wherein the films wrapped around the core are of different strengths.

14. A process for sealing a fluid connection within an apparatus, which process comprises:

providing a gasket material comprising a core of elongated polytetrafluoroethylene (PTFE) and means to constrain the core from lateral flow when the core is placed under compressive pressure, the means comprising a film wrapped around the core of sufficient tensile strength to limit creep of the PTFE core when the gasket is placed under pressure;

attaching the gasket material within a flange of the apparatus;

applying pressure to compress the gasket and seal the fluid connection together, forming a fluid tight seal.

15. The process of claim 14 that further comprises providing a gasket material comprising a core of expanded PTFE wrapped in a film of expanded PTFE coated with a fluoropolymer.

16. The process of claim 14 that further comprises releasing the gasket material from the fluid connection after compression by prying the material loose, the gasket material separating intact from the fluid connection.

17. A gasket material for sealing a fluid connection; which gasket material comprises:

a core of elongated polytetrafluoroethylene (PTFE);

means to constrain the core from lateral flow when the core is place under compressive pressure to establish and maintain a fluid seal, the means comprising a tight film wrap around the PTFE core of sufficient tensile strength to limit creep of the PTFE core when the gasket is placed under pressure.

18. The gasket material of claim 17 wherein the gasket material includes an adhesive layer on at least one side to assist in retaining the gasket material in place on a sealing surface.

19. The gasket material of claim 18 wherein the adhesive layer comprises a releasable coating of pressure sensitive adhesive.

20. The gasket material of claim 17 wherein the elongated PTFE core comprises an expanded PTFE; and the film comprises expanded PTFE coated in a melt processible thermoplastic fluoropolymer.

21. The gasket material of claim 20 wherein the gasket material readily releases from the fluid connection after it has been fully compressed against it.

22. The gasket of material of claim 17 wherein the gasket material is pre-densified prior to mounting to limit the amount of compression required to establish a seal.

23. The gasket material of claim 17 wherein more than one film is wrapped around the core.

24. The gasket material of claim 23 wherein the films wrapped around the core are of different densities.

25. The gasket material of claim 1 wherein the gasket material is pre-densified prior to mounting to limit the amount of compression required to establish a seal.

26. The process of claim 14 that further comprises pre-densifying the gasket material prior to mounting to limit the amount of compression required to establish a seal.

* * * * *